US012691506B2

(12) United States Patent　　　(10) Patent No.: US 12,691,506 B2
Ellsworth et al.　　　　　　　　　　(45) Date of Patent: Jul. 28, 2026

(54) ROTATING CUTTING TOOL WITH A HEAT PIPE

(71) Applicant: The Boeing Company, Chicago, IL (US)

(72) Inventors: David Glen Ellsworth, Kent, WA (US); Bryan Galbreath, North Tustin, CA (US); Mark Everette Albrecht, Lake Stevens, WA (US)

(73) Assignee: THE BOEING COMPANY, Arlington, VA (US)

( * ) Notice: Subject to any disclaimer, the term of this patent is extended or adjusted under 35 U.S.C. 154(b) by 761 days.

(21) Appl. No.: 17/939,318

(22) Filed: Sep. 7, 2022

(65) Prior Publication Data

US 2024/0075540 A1　　Mar. 7, 2024

(51) Int. Cl.
B23B 51/06　　　(2006.01)
B23C 5/28　　　(2006.01)
B23D 77/00　　　(2006.01)
(52) U.S. Cl.
CPC .............. B23B 51/068 (2022.01); *B23C 5/28* (2013.01); *B23D 77/006* (2013.01)
(58) Field of Classification Search
CPC ... B23B 51/06; B23B 51/068; B23B 2250/12; B23B 2250/122; B23C 5/28; B23C 2250/12
See application file for complete search history.

(56) References Cited

U.S. PATENT DOCUMENTS

| | | | |
|---|---|---|---|
| 3,670,606 A | 6/1972 | Blomgren, Sr. et al. | |
| 10,974,329 B2 * | 4/2021 | Brunner | B23D 77/006 |

FOREIGN PATENT DOCUMENTS

| | | | | |
|---|---|---|---|---|
| CN | 102806376 A | | 12/2012 | |
| CN | 103537950 A | * | 1/2014 | B23C 5/28 |
| CN | 103639491 A | * | 3/2014 | B23B 51/06 |
| CN | 104416195 A | * | 3/2015 | B23B 51/06 |
| CN | 104526027 A | * | 4/2015 | B23B 51/06 |
| CN | 104551126 A | | 4/2015 | |
| CN | 104625171 A | * | 5/2015 | B23B 51/06 |
| CN | 103537737 B | * | 1/2017 | B23B 51/02 |
| CN | 108500357 A | * | 9/2018 | B23C 5/28 |
| CN | 210817816 U | | 6/2020 | |
| KR | 20090068030 A | * | 6/2009 | B23C 5/283 |

* cited by examiner

*Primary Examiner* — Ryan Rufo
(74) *Attorney, Agent, or Firm* — COATS & BENNETT, PLLC

(57) ABSTRACT

A cutting tool that includes an elongated body with a first end and an opposing second end. A cutting edge is positioned at the first end. A heat pipe extends within an interior space of the body and has a first end in proximity to the cutting edge and a second end in proximity to the second end of the body. The interior space is enclosed within the body and comprises walls that extend around an interior space. The walls comprise a geometric configuration for a liquid within the heat pipe to move towards the first end of the heat pipe during rotation of the body.

20 Claims, 7 Drawing Sheets

ROTATING THE BODY AND
CUTTING MATERIAL FROM WORKPIECE — 300

HEATING THE LIQUID AND CHANGING
THE LIQUID TO A GAS — 302

CONTACTING THE GAS AGAINST
THE WALLS OF THE HEAT PIPE — 304

CONDENSING THE GAS
BACK TO THE LIQUID — 306

MOVING THE LIQUID ALONG THE HEAT PIPE
TOWARDS THE CUTTING TIP — 308

ROTATING CUTTING TOOL WITH A HEAT PIPE

TECHNOLOGICAL FIELD

The present disclosure relates generally to the field of cutting tools and, more specifically, to cutting tools that include a heat pipe that contains a liquid to cool a cutting edge.

BACKGROUND

Cutting tools include a cutting edge to contact against and remove material from a workpiece. Examples of cutting tools include but are not limited to drill bits, reamers, and end mills. Thermal management is a challenge for cutting tools. The sections of the cutting tool that contact the workpiece are heated to high temperatures. The high temperatures can damage the cutting tools, reduce their effective life, and/or reduce the effectiveness of the cutting process.

Traditionally, liquids such as coolants or lubricants are applied to the cutting tool and/or workpiece during the cutting process. The liquid is applied to the cutting area with the liquid contacting against both the cutting edge and the workpiece. In one specific example, liquid is supplied into a bore that is drilled into the workpiece. As the depth of the bore increases, it becomes more difficult to supply the liquid to the bottom of the bore. Another issue with this method is the liquid can spread and cover a larger area of the workpiece outside of the cutting area. This can make handling the workpiece more difficult as the liquid may cause the workpiece to become slippery. The liquid can also spread to the tool and other areas of a workstation which requires the technician to clean the area.

Another issue with the existing methods of supplying liquid to the cutting area is the added system components and cleaning required post machining to remove the liquid residue contaminates. Pressurized systems deliver lubricant or coolant to the cutting area during the cutting process. Further, horizontal and vertically-upward cutting orientations result in the liquid readily spreading outside of the cutting area.

Cutting without cooling, known as dry cutting (also known as dry drilling for a drilling process), results in a low tool life and can degrade cut quality due to increased heat.

SUMMARY

One aspect is directed to a cutting tool comprising an elongated body comprising a first end and an opposing second end. A cutting edge is positioned at the first end. A heat pipe extends within an interior space of the body with a first end in proximity to the cutting edge and a second end in proximity to the second end of the body. The interior space is enclosed within the body and comprises walls that extend around an interior space. The walls comprise a geometric configuration for a liquid within the heat pipe to move towards the first end of the heat pipe during rotation of the body.

In another aspect, the geometric configuration comprises the walls of the heat pipe with a tapered shape with the first end having a larger width than the second end.

In another aspect, the tapered shape is continuous along the heat pipe.

In another aspect, the heat pipe extends completely through the body and further comprising a first plug mounted at the first end of the interior space and a second plug mounted at the second end of interior space with the first plug and the second plug enclosing the interior space of the heat pipe.

In another aspect, the geometric configuration comprises surface configurations along the walls of the heat pipe to direct the liquid along the interior space towards the first end during rotation of the body.

In another aspect, the heat pipe comprises a central axis that is colinear with a longitudinal axis of the body.

In another aspect, the heat pipe comprises a helical shape with a plurality of bends between the first end and the second end of the heat pipe.

In another aspect, at least one channel extends through the body and comprises a first port at the first end of the body and a second port at the second end of the body with the at least one channel being spaced away from the heat pipe along the length of the body.

In another aspect, the at least one channel comprises a helical shape.

In another aspect, fins extend radially outward from the body and away from heat pipe with the fins forming a heat sink with exposed sides to remove heat from the body.

In another aspect, an insert is mounted within a bore in the interior of the body with the insert comprising an outer side that mounts against walls of the bore and an interior opening that forms the heat pipe and with the insert constructed from a different material than the body.

One aspect is directed to a cutting tool comprising a body comprising an elongated shape with a length that extends between a cutting edge at a first end and an opposing second end. A bore extends into the body from the second end and extends along the length and terminates at a bore first end positioned towards the cutting edge at the first end of the body. A heat pipe is positioned within the bore and comprises walls and a heat pipe first end and a heat pipe second end. The heat pipe comprises a geometric configuration for a liquid within the heat pipe to move towards the heat pipe first end during rotation of the body.

In another aspect, an insert is mounted within the bore and constructed from a different material than the body with the heat pipe positioned within an interior of the insert and spaced away from the body.

In another aspect, the bore extends completely through the body and further comprising a first plug mounted in the bore at the first end of the body and a second plug mounted in the bore at the second end of the body.

In another aspect, the geometric configuration comprises a tapered shape with a width that increases from the heat pipe second end to the heat pipe first end.

In another aspect, the geometric configuration comprises threads formed along the walls of the heat pipe.

In another aspect, the heat pipe is straight with a central axis that is colinear with a longitudinal axis of the body.

In another aspect, the heat pipe comprises a helical shape.

One aspect is directed to a method of cooling a rotating cutting tool with the cutting tool comprising an elongated body with opposing first and second ends, a tip positioned at the first end, a heat pipe that extends within an interior of the body with a first end in proximity to the tip and a second end in proximity to the second end of the body, and walls of the heat pipe comprising a geometric configuration. The method comprises: rotating the body and removing material from a work piece; heating liquid that is positioned along an evaporator section of the heat pipe and changing the liquid into a gas; moving the gas along the heat pipe and into a condenser section of the heat pipe with the condenser section axially spaced away from the tip; contacting the gas against walls of the condenser section of the heat pipe; condensing the gas back into the liquid along the condenser section; and moving the liquid towards the tip due to a centrifugal force from the rotating body and the geometric configuration of the heat pipe.

In another aspect, the method further comprises rotating the body and using the centrifugal force to push the liquid to a larger width section of the heat pipe at the tip.

The features, functions and advantages that have been discussed can be achieved independently in various aspects or may be combined in yet other aspects, further details of which can be seen with reference to the following description and the drawings.

DETAILED DESCRIPTION

Figure 1:
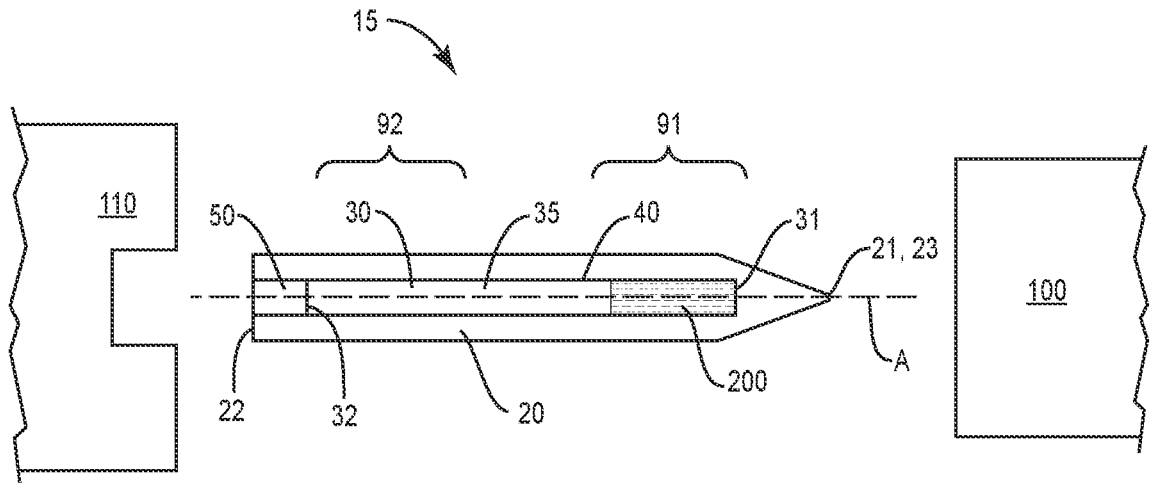
FIG. 1 is a schematic section view of a cutting tool with a heat pipe extending through an interior of a body.

The present application discloses a cutting tool 15 as schematically illustrated in FIG. 1. The cutting tool 15 includes a body 20 with an elongated shape that includes a first end 21 for cutting into a workpiece 100 and a mounting end 22 to mount to a rotational device 110. The body 20 is configured to be rotated by the rotational device 110 about a longitudinal axis A to cause a cutting edge at a tip 23 at the first end 21 to remove material from the workpiece 100. A heat pipe 30 extends through the interior of the body 20 and includes an interior space 35 that is enclosed to contain a liquid 200. The heat pipe 30 includes a geometric configuration 40 within the interior space 35 to cause the liquid 200 to move within the heat pipe 30 towards the tip 23 during rotation. This provides for the liquid to cool the cutting tip 23.

The heat pipe 30 includes an enclosed interior space 35 to contain the liquid 200 and prevent its escape. The heat pipe 30 provides for cooling the cutting tool 15 and particularly the cutting edge 24 at the tip 23 and sections of the body 20 that contact against the workpiece 100. The heat pipe 30 can be used for cutting in various orientations, including vertically upward and downward, as well as horizontal directions. The heat pipe 30 is also effective in micro-gravity environments such as during spaceflight to move the liquid 200 towards the cutting tip 23 during rotation of the body 20.

The heat pipe 30 includes a length that extends between a first end 31 and a second end 32. The heat pipe 30 includes two sections along the length: an evaporator section 91 at the first end 31 that vaporizes the liquid 200; and a condenser section 92 at the second end 32 whose temperature is below the dew point of the gas and therefore causes the gas to condense back to the liquid 200. The length of each section 91, 92 can vary. In one example, an adiabatic section is positioned between the evaporator section 91 and the condenser section 92. The adiabatic section is insulated such that heat loss is prevented and/or minimized.

In use, the cutting tool 15 is inserted into the workpiece 100 during the cutting process. The liquid 200 is vaporized into a gas in the evaporator section 91 during the cutting process by absorbing the heat from, and thereby cooling the cutting tip 23. The gas moves along the heat pipe 30 away from the first end 31 and the temperature gradually decreases along the length due to air cooling and from conduction through the solid body to the cold end until the temperature drops below the dew point and the gas condenses back to a liquid, releasing its latent heat.

The cutting tool 15 is configured to be attached to the rotational device 110 that provides a rotational force. In one example, a section of the body 20 at the second end 22 includes a cylindrical shape configured to be mounted in a receptacle in the rotational device 110. The cutting tool 15 can include a variety of different configurations. Examples include but are not limited to a drill bit, a reamer, and an end mill.

FIGS. 2A-6 and 8 illustrate examples of cutting tools 15. The cutting tools 15 include a body 20 with an elongated shape that extends between the first end 21 and the second end 22. The body 20 includes a longitudinal axis A extends along the body 20 and through a center of each of the ends 21, 22. The longitudinal axis A is straight. The working end 21 is configured to act on and remove material from the workpiece 100. The first end 21 includes a tip 23 having a pointed shape to engage with the workpiece 100. Cutting edges 24 such as threads or teeth can extend along the body 20 adjacent to the tip 23 to facilitate engagement by the tip 23 and/or remove additional material from the workpiece 100.

The second end 22 is configured to connect to the rotational device 110. In one example, the body 20 can include a substantially cylindrical sectional shape between the second end 22 and the cutting edges 24. This shape facilitates insertion into and engagement with the rotational device 110.

The heat pipe 30 is positioned within the interior of the body 20. The heat pipe 30 includes an elongated shape with an interior space 35 having a first end 31 positioned towards the working end 21 of the body 20 and an opposing second end 32 positioned towards the mounting end 22. Walls 33 extend around the interior space 35. The sectional shape of the heat pipe 30 can vary, with examples including but not limited to circular, polygonal, and oval. The heat pipe 30 is enclosed to contain the liquid 200. One or more plugs 50 are mounted in the heat pipe 30 to enclose the interior space 35.

The liquid 200 is contained within the interior space 35 of the heat pipe 30 and acts to cool the cutting tip 23 when the cutting tool 15 is acting on the workpiece 100. Various types of liquid 200 can be used in the heat pipe 30, including but not limited to water, oil, and various coolants. The liquid 200 is heated during use while in the evaporator section 91 and changes phase from a liquid to a gas. The gas then moves along the heat pipe 30 and cools and condenses along the walls 33 of the heat pipe 30 in the condenser section 92 and returns to a liquid. The centrifugal force from the rotation and the geometric configuration causes the liquid 200 to move along the length of the heat pipe 30 from the condenser section 92 towards the evaporator section 91 and the first end 31.

The heat pipe 30 has a geometric configuration 40 that moves the liquid 200 along the heat pipe 30 towards the first end 31 during rotation of the cutting tool 15. Geometric configurations 40 can include but are not limited to a tapered shape and surface configuration of the walls 33.

One or more plugs 50 are mounted in the heat pipe 30 to enclose the heat pipe 30. The inner edges of the one or more plugs form the ends 31, 32 of the heat pipe 30. The plugs 50 can also form a working part of the cutting tool 15, such as the cutting tip 23.

Figures 2A, 2B:
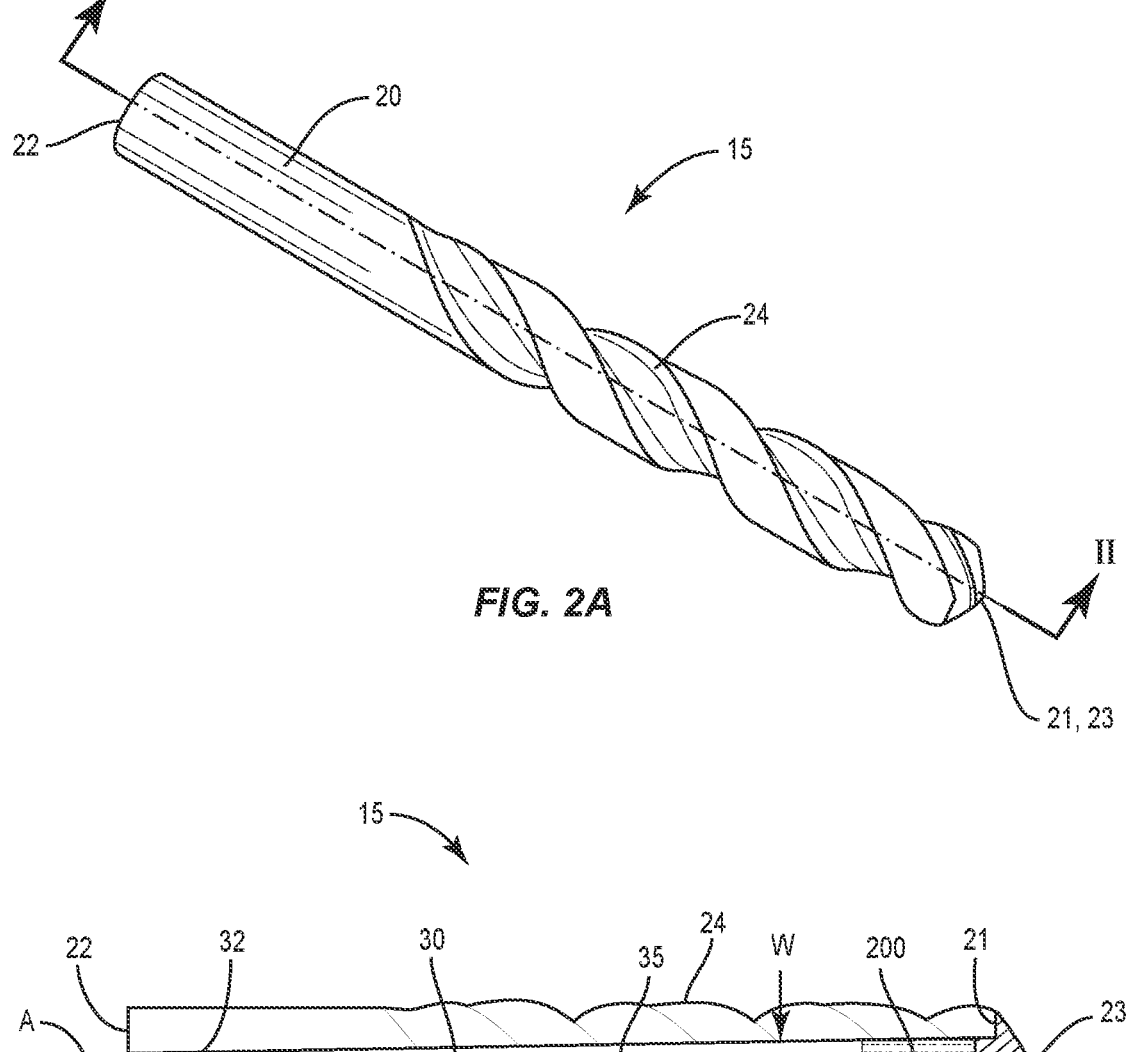
FIG. 2A is a perspective view of a cutting tool.
FIG. 2B is a schematic section view cut along line II-II of FIG. 2A.

FIGS. 2A and 2B includes an example of a cutting tool 15 that includes an elongated body 20 with a first end 21 and a second end 22. The heat pipe 30 is formed by a bore 60 that extends through the entire length of the body 20. The bore 60 includes a tapered shape with a width that is wider at the working end 21 and narrower at the mounting end 22. In one example, the bore 60 is formed by inserting a cutting tool from the working end 21 and removing the material from the body 20. In one example, the tapered shape of the bore 60 requires machining of the body 20 at the widest part of the bore 60 and machining the body 20 to the narrower end.

Plug 50b is mounted in the bore 60 at the second end 22 of the body 20. The plug 50b includes an outer edge that is flush with the mounting end 22 of the body 20. A first plug 50a is mounted in the bore 60 at the first end 21. The plug 50a includes the cutting tip 23 and tapers to conform to the size of the body 20 and to compliment the cutting edges 24 that extend along the body 20. In one example, plug 50b is initially inserted in the bore 60, the liquid 200 is inserted, and then the first plug 50a is inserted in the bore 60 to contain the liquid 200.

The heat pipe 30 is formed in the bore 60 and extends along the body 20 with the first end 31 formed at the plug 50a and the second end 32 formed at the plug 50b. The heat pipe 30 includes an enclosed interior space 35 to contain the liquid 200. The geometric configuration 40 includes the tapered shape of the heat pipe 30. The shape increases in width from a smaller second end 32 to a larger first end 31. The width w is measured between the walls 33 perpendicular to the longitudinal axis A. During use, as the body 20 rotates centrifugal force pushes the liquid 200 to the large section of the heat pipe 30 at the evaporator section 91 and the cutting tip 23. This ensures that the cutting tool 15 has the ability to cool the cutting tip 23 regardless of axis orientation. In one example, the taper is continuous between the second and first ends 32, 31. In another example, the taper is discontinuous with one or more sections along the length with a constant width. The sectional shape of the heat pipe 30 can be the same along the length or can vary. In one specific example, the heat pipe 30 includes a constant shape that increases in size continuously along the length between the second and first ends 32, 31. In one example, the heat pipe 30 includes a circular sectional shape.

Figure 3:
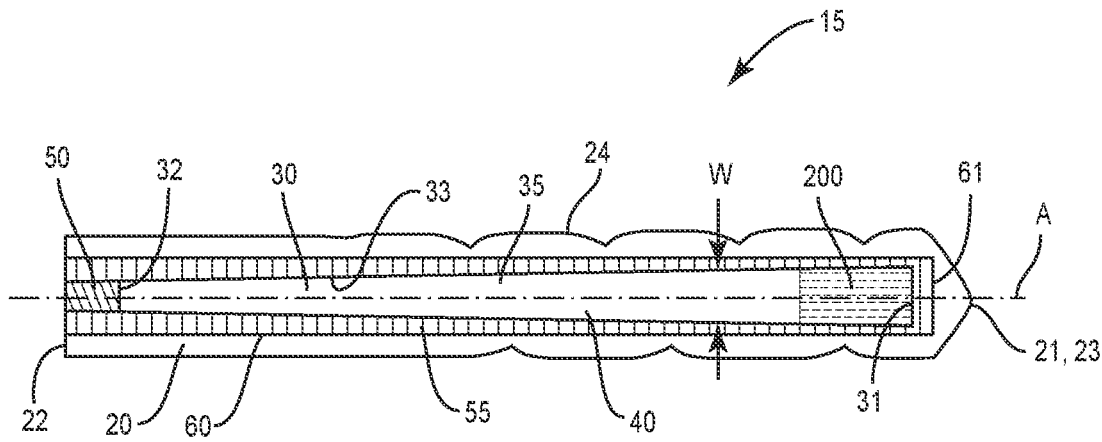
FIG. 3 is a schematic section view of a cutting tool.

In the example illustrated in FIG. 2B, the heat pipe 30 is formed by the bore 60 in the body 20. In another example, the heat pipe 30 is formed in an insert 55 mounted in the bore 60. FIG. 3 illustrates an example with the bore 60 extending inward into the body 20 from the second end 22. The bore 60 terminates within the interior of the body away from the first end 21. In the example of FIG. 3, the bore 60 includes a constant width along the length although other examples can include different widths (e.g., tapering width that reduces from the second end 22).

The insert 55 is mounted in the bore 60 and includes the heat pipe 30. The heat pipe 30 is contained within the insert 55 and is spaced away from the body 20. In one example as illustrated in FIG. 3, the insert 55 completely fills the bore 60 to facilitate thermal heat conduction. In another example, the insert 55 is smaller than the bore 60. The insert 55 can be secured in the bore 60 in various manners, including but not limited to friction fit, adhesives, mechanical fasteners, and combinations thereof. In one example, the insert 55 is constructed from the same material as the body 20. In another example, the insert 55 is constructed from a different material than the body 20. The different material can have a different thermal conductivity to facilitate cooling of the cutting tool 15. In one example to increase thermal transfer capability, the insert 55 is constructed from materials that are more conductive than the material of the body 20. In one example, the body 20 is constructed from metal, such as steel, and the insert 55 is constructed from pure carbon.

The interior space 35 of the heat pipe 30 includes a geometric configuration 40 to move the liquid 200 towards the first end 31 during rotation of the body 20. In the example of FIG. 3, the geometric configuration 40 includes a tapered shape that increases in width W from the second end 32 to the first end 31.

The first end 31 of the heat pipe 30 is formed by an end wall of the insert 55. The second end 32 is formed by a plug 50 mounted in the insert 55. In another example, the plug 50 is mounted in the bore 60 and abuts against the end of the insert 55 to form the second end 32 and seal the heat pipe 30.

In one example, the bore 60 is formed by inserting a tool into the body 20 from the second end 22. The tool is inserted a limited distance as the bore 60 does not extend completely through the length with the end 61 of the bore 60 spaced away from the cutting tip 23 and first end 21 of the body 20.

Figure 4:
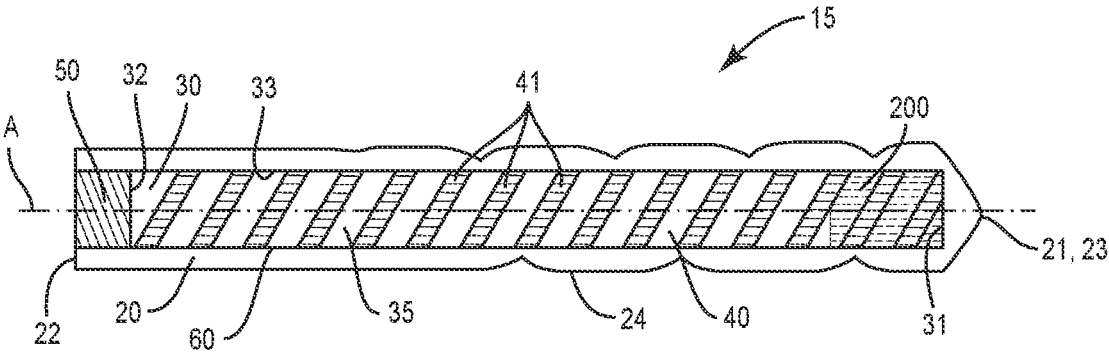
FIG. 4 is a schematic section view of a cutting tool.
Figure 5:
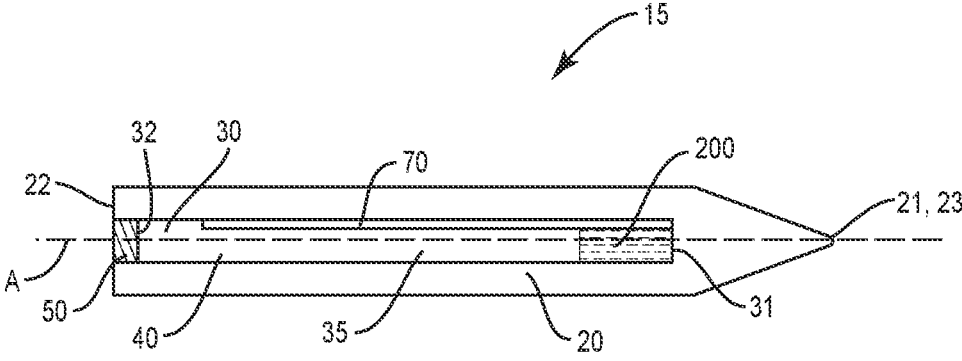
FIG. 5 is a schematic section view of a cutting tool.

FIG. 4 includes a cutting tool 15 in which the geometric configuration 40 includes a surface configuration 41 on the walls 33 of the heat pipe 30. The surface configuration 41 can be formed in various manners, including but not limited to machined, tapped, or preformed into the bore 60. The surface configuration 41 is configured to move the liquid 200 towards the cutting tip 23 during rotation. The surface configuration 41 can include various forms. FIG. 4 includes the surface configuration 41 including threads that helically extend along the walls 33. Other examples include but are not limited to internal rifling and grooves that extend along the walls 33. The surface configuration 41 takes advantage of the rotating body 20 to move the liquid along the length of the heat pipe 30 towards the cutting tip 23. The surface configuration 41 can be used with or without tapering of the heat pipe 30.

The cutting tool 15 can include one or more liquid acquisition devices 70 to move the liquid 200 towards the first end 31 of the heat pipe 30. The liquid acquisition devices 70 can be used with or without a geometric configuration 40 of the heat pipe 30. Examples of liquid acquisition devices 70 include but are not limited one or more veins, sponges, screens, and meshes. The liquid acquisition devices 70 enable capillary action to move the liquid 200 and also takes advantage of the rotating body 20 to move the liquid 200 back to the cutting tip 23.

The liquid acquisition devices 70 extend along the heat pipe 30 and collect the liquid 200. The liquid acquisition devices 70 move the liquid along their length towards the first end 31. The liquid acquisition devices 70 can be attached to the walls 33 or can be positioned within the interior of the heat pipe 30. The length of the liquid acquisition devices 70 can vary, from a length that extends along an entirety of the heat pipe 30 to shorter lengths that extend along a limited section of the heat pipe 30. The cutting tool 15 can include a single liquid acquisition device 70, or multiple liquid acquisition devices 70. In examples with multiple liquid acquisition devices 70, the devices 70 can be the same or different. The liquid acquisition devices 70 can be straight or can have a helical shape similar to a screw. In one example, a helical liquid acquisition device 70 works with the rotational motion of the body 20. The liquid acquisition device 70 can be used with or without a geometric configuration 40 of the heat pipe 30.

Figure 6:
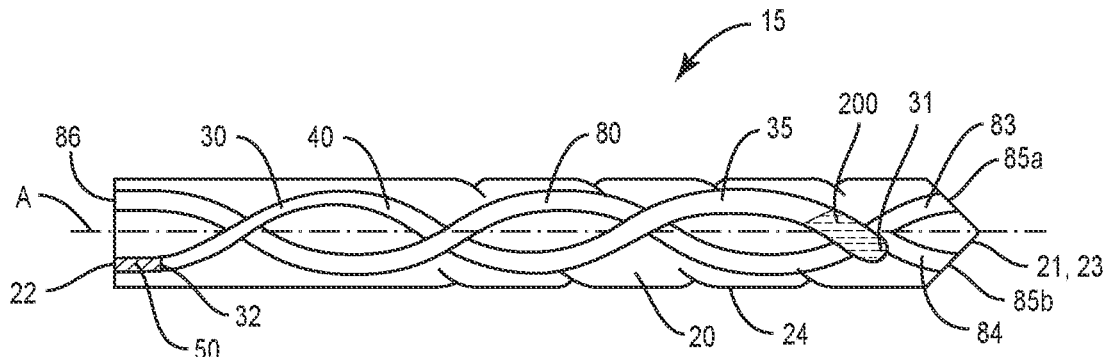
FIG. 6 is a schematic section view of a cutting tool.

In one example as illustrated in FIGS. 2B, 3, and 4, the heat pipe 30 includes a straight shape. The centerline of the heat pipe 30 is colinear with the longitudinal axis A of the body 20. The heat pipe 30 can also include different shapes. FIG. 6 includes a heat pipe 30 with a helical shape that extends through the body 20. The heat pipe 30 extends into the body 20 from the second end 22 and terminates in proximity to the first end 21. A plug 50 is mounted in the heat pipe 30 at the second end 22 and forms the end 32 of the heat pipe 30.

In one example, the geometric configuration 40 is the helical shape of the heat pipe 30. The helical shape forces the liquid 200 towards the first end 31 during rotation of the body 20. In another example, one or more other geometric configurations 40 are included with the heat pipe 30 such as a tapered shape and surface configurations 41.

In one example, one of more channels 80 extend through the body 20. The channels 80 includes a port 85 at the first end 21 of the body 20 and a port 86 at the second end 22 of the body 20. The channels 80 provide a conduit for supplying a cooling agent such as air or a liquid into the port 86 and through the length of the body 20 through the port 85 to the cutting tip 23. FIG. 6 includes the channel 80 splitting in proximity to the first end 21 of the body 20 and having a first section 83 that leads to a first port 85a and a second section 84 that leads to a second port 85b.

Figure 7:
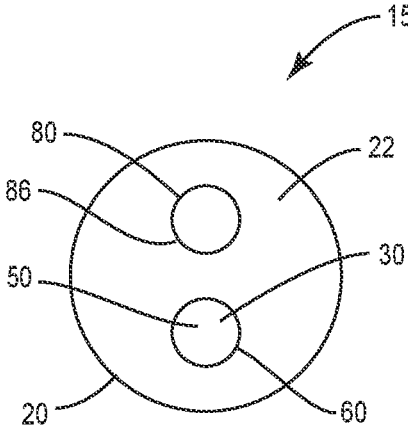
FIG. 7 is an end view of the cutting tool of FIG. 6.

The channel 80 includes a helical shape along the length of the body 20 and is spaced away from the heat pipe 30. FIG. 7 illustrates an end view of the second end 22 of the body 20. The bore 60 that forms the heat pipe 30 is positioned at an interior of the body 20. A plug 50 is mounted in the heat pipe 30 at the second end 22 to enclose the interior space of the heat pipe 30 and contain the liquid. The bore 60 is spaced away from the port 86 at the second end of the channel 80.

Figure 8:
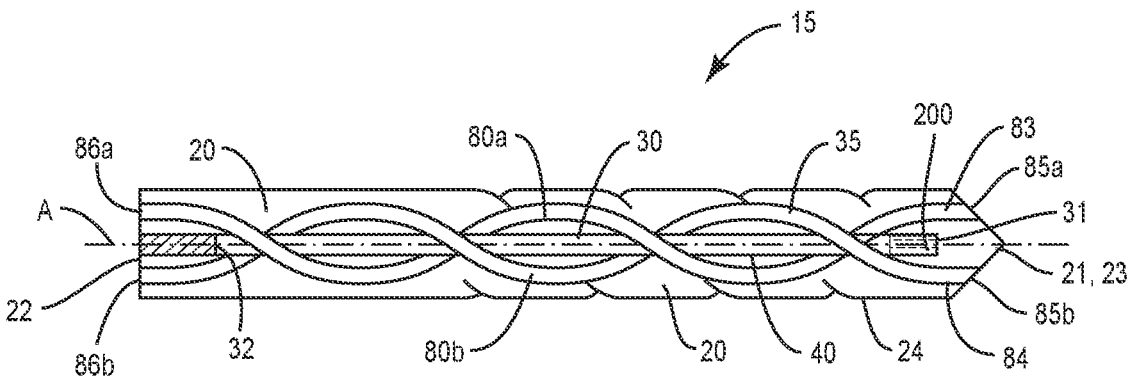
FIG. 8 is a schematic section view of a cutting tool.
Figure 9:
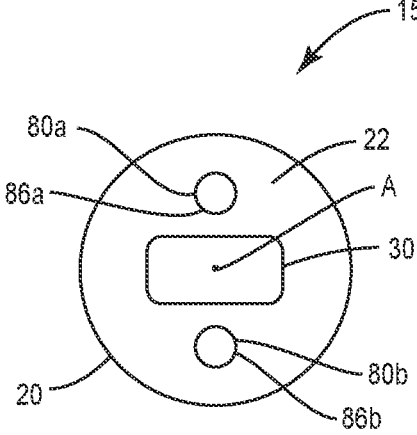
FIG. 9 is an end view of the cutting tool of FIG. 8.

FIG. 8 includes a cutting tool 15 with a pair of channels 80a, 80b and a heat pipe 30. The channels 80a, 80b include helical shapes that extend through the body 20. The first channel 80a extends between a port 85a at the first end 21 of the body 20 at the tip 23 and a port 86a at the second end 22 of the body 20. Likewise, the second channel 80b extends the length of the body 20 and includes a port 85b at the first end 21 and a port 86b at the second end 22. The heat pipe 30 includes a straight shape that is colinear with the longitudinal axis A of the body 20. The heat pipe 30 includes a geometric configuration 40 to move the liquid 200 towards the end 31. The helical channels 80a, 80b wrap around the heat pipe 30. FIG. 9 illustrates an end view of the cutting tool 15 of FIG. 8. The channels 80a, 80b are spaced away from the heat pipe 30.

Figure 10:
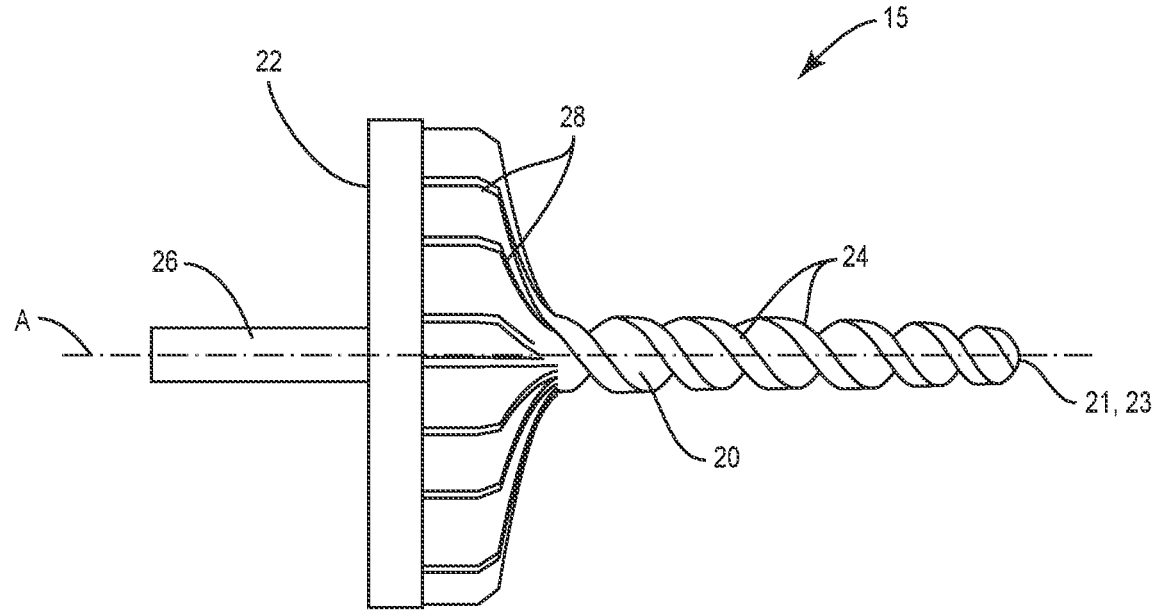
FIG. 10 is a side view of a cutting tool.

The body 20 can further include fins 28 to further remove heat. As illustrated in FIG. 10, the body 20 includes radially-extending fins 28. The fins 28 are spaced apart around the exterior of the body 20. The fins 28 include exposed front and back surfaces. The fins 28 can extend directly outward from the longitudinal axis A or can include a curved shape. The fins 28 are integral with the body and act as a heat sink to remove the heat caused by the contact with the workpiece 100. In one example as illustrated in FIG. 10, the fins 28 extend outward from a section of the body 20 that is axially rearward from the cutting tip 23. The body 20 can further include a connector 26 that axially extends outward along the longitudinal axis A and includes a cylindrical shape to engage with the rotational device 110. The heat pipe 30 (not illustrated in FIG. 10) extends through an interior of the body 20 inward from the fins 28. In one example, the fins 28 take the form of an impeller. The fins 28, particularly when shaped like an impeller, blows air towards the workpiece 100 to assist blowing cut debris off the workpiece 100. In one example, the fins 28 include an integrated countersink.

The heat pipe 30 can include various sectional shapes. Examples include but are not limited to a circular, rectangular, and oval.

In one example, the cutting tool 15 includes a single heat pipe 30. In another example, the cutting tool 15 includes two or more heat pipes 30. The heat pipes 30 are independent and spaced apart along the interior of the body 20. The different heat pipes 30 can include the same or different shapes and/or sizes. Further, the different heat pipes 30 can include the same or different liquids 200.

In the various examples, the liquid 200 may not flow along the walls 33 of the heat pipe 30 towards the first end 31. This may particularly happen along the wider sections of the heat pipe 30. To mitigate the surface tension of the liquid 200 on the walls 33, a hydrophobic coating 39 is applied to the walls 33 to increase the efficiency of the liquid movement.

Figure 11:
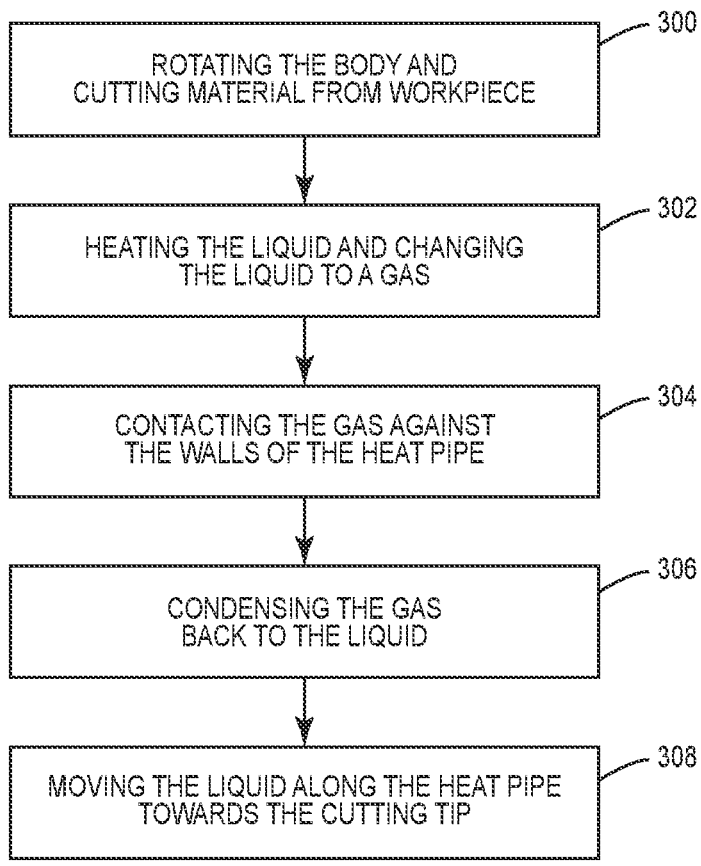
FIG. 11 is a flowchart diagram of a method of cooling a cutting tool.

FIG. 11 illustrates a method of cooling a cutting tool 15. The method includes rotating the body 20 and removing material from a workpiece 100 with the cutting tip 23 (block 300). This cutting process causes the body 20 to become heated particularly along the cutting tip 23. The heating of the body 20 heats the evaporator section 91 which in turn heats the liquid 200 and changes the liquid 200 into a gas (block 302). The gas moves along the length of the heat pipe 30 towards the second end 32. The gas contacts against a section of the walls 33 along the condenser section 92 that is spaced axially away from the cutting tip 23 (block 304). The gas condenses on the walls 33 of the condenser section 92 back into the liquid 200 (block 306). The liquid against the walls 33 is then moved along the heat pipe 30 towards the cutting tip 23 due to the rotation and the centrifugal forces of the rotating body 20 (block 308).

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A cutting tool comprising:
an elongated body comprising a first end and an opposing second end;
a cutting edge positioned at the first end;
a bore that extends into the body from the second end with the bore comprising a constant width, the bore comprising an end wall opposing the second end;
a heat pipe positioned within the bore, the heat pipe defining an interior space of a tapered shape for a liquid within the heat pipe to move towards the cutting edge during rotation of the body;

the heat pipe comprising a closed bottom end wall spaced apart from the bore end wall, an opposing open top end at the second end, and a continuous side wall that extends along the bore between the bottom end wall and the open top end; and the side wall having a thickness that increases from the closed bottom end wall to the open top end, as such, the width of the interior space decreases from the closed bottom end wall to the open top end.

2. The cutting tool of claim 1, wherein the thickness of the heat pipe and the width of the interior space have continuous tapers from the closed bottom end wall to the open top end.

3. The cutting tool of claim 2, further comprising a plug mounted in the open top end of the heat pipe to enclose the interior space of the heat pipe.

4. The cutting tool of claim 3, wherein the plug comprises an outer end that is flush with the second end of the body.

5. The cutting tool of claim 1, wherein the heat pipe comprises a central axis that is colinear with a longitudinal axis of the body.

6. The cutting tool of claim 1, wherein the heat pipe is constructed from a different material than the body.

7. The cutting tool of claim 1, wherein the liquid is water.

8. The cutting tool of claim 1, wherein the cutting tool is a drill bit.

9. The cutting tool of claim 1, wherein the heat pipe is secured in the bore by a friction fit.

10. The cutting tool of claim 1, wherein the end wall of the bore is spaced away from the first end of the body.

11. A method of cooling, the method comprising:

providing the cutting tool of claim 1;

rotating the body and removing material with the cutting edge from a work piece;

heating the liquid that is positioned along an evaporator section of the heat pipe and changing the liquid into a gas;

moving the gas along the heat pipe and into a condenser section of the heat pipe with the condenser section axially spaced away from the cutting edge and located further from the cutting edge than the evaporator section;

contacting the gas against the sidewall of the heat pipe along the condenser section;

condensing the gas back into the liquid along the condenser section; and moving the liquid towards the cutting edge due to a centrifugal force from the rotating body and the tapered shape of the heat pipe.

12. A cutting tool comprising:

a body comprising an elongated shape with a length that extends between a cutting edge at a first end and an opposing second end;

a bore of constant width that extends into the body from the second end, the bore terminates at an end wall opposing the second end;

a heat pipe positioned within the bore, the heat pipe comprising a closed bottom end wall spaced apart from the bore end wall, an opposing open top end at the second end, and a continuous side wall that extends along the bore between the bottom end wall and the open top end; and wherein an interior diameter of the heat pipe continuously tapers such that the interior diameter decreases in a direction going away from the closed bottom end wall towards the open top end of the heat pipe; and wherein the tapered width causes a liquid within the heat pipe to move towards the heat pipe closed bottom end wall during rotation of the body.

13. The cutting tool of claim 12, wherein the heat pipe is constructed from a different material than the body.

14. The cutting tool of claim 12, further comprising a plug mounted in the open top end of the heat pipe to enclose the heat pipe.

15. The cutting tool of claim 12, wherein the side wall has a thickness that increases from the closed bottom end wall to the open top end.

16. The cutting tool of claim 12, wherein the heat pipe is straight with a central axis that is colinear with a longitudinal axis of the body.

17. The cutting tool of claim 12, wherein the heat pipe is secured by a friction fit.

18. The cutting tool of claim 12, wherein the end wall of the bore is spaced away from the first end of the body.

19. The cutting tool of claim 12, wherein the cutting tool is a drill bit.

20. The cutting tool of claim 12, wherein the liquid is water.

\* \* \* \* \*